(12) United States Patent
Cole et al.

(10) Patent No.: US 8,314,769 B2
(45) Date of Patent: Nov. 20, 2012

(54) HIGH PERFORMANCE DETECTION PIXEL

(75) Inventors: Barrett E. Cole, Bloomington, MN (US); Robert Higashi, Shorewood, MN (US)

(73) Assignee: Honeywell International Inc., Morristown, NJ (US)

( * ) Notice: Subject to any disclaimer, the term of this patent is extended or adjusted under 35 U.S.C. 154(b) by 384 days.

(21) Appl. No.: 12/769,097

(22) Filed: Apr. 28, 2010

(65) Prior Publication Data

US 2011/0267322 A1   Nov. 3, 2011

(51) Int. Cl.
*G09G 3/34* (2006.01)
*G01J 5/00* (2006.01)

(52) U.S. Cl. .................... 345/106; 250/338.1

(58) Field of Classification Search ........... 345/106, 345/205, 206; 250/338.1, 339.01
See application file for complete search history.

(56) References Cited

U.S. PATENT DOCUMENTS

| | | | |
|---|---|---|---|
| RE36,136 E | 3/1999 | Higashi et al. | |
| RE36,706 E | 5/2000 | Cole | |
| 6,097,031 A | 8/2000 | Cole | |
| 6,144,285 A | 11/2000 | Higashi | |
| 6,495,070 B1 | 12/2002 | Cole et al. | |
| 6,838,306 B2 | 1/2005 | Cole | |
| 7,145,143 B2 | 12/2006 | Wood et al. | |
| 2007/0120058 A1* | 5/2007 | Blackwell et al. | 250/338.1 |
| 2008/0035846 A1* | 2/2008 | Talghader et al. | 250/338.1 |

OTHER PUBLICATIONS

Bradford et al., "U.S. Participation In the JAXA-Led SPICA Mission: The Background-Limited Infrared-Submillimeter Spectrograph (BLISS), A Program Report for the Astro 2010 Decadal Survey*," 20 pages, Apr. 1, 2009.
Ciupa et al., "Performance Limitations of Photon and Thermal Infrared Detectors," Opto-Electr. Rev., vol. 5, No. 4, pp. 257-265, 1997.
Hanson, "Barriers to Background-Limited Performance for Uncooled IR Sensors," Proc. of SPIE, vol. 5406, pp. 454-464, 2004.
Kenyon et al., "Background-Limited Membrane-Isolated TES Bolometers for Far-IR/Submillimeter Direct-Detection Spectroscopy," Nuclear Instruments and Methods in Physics Research A, vol. 559, pp. 456-458, 2006.
Mottin et al., "New Technological Development For Far Infrared Bolometer Arrays," 11 pages, Jul. 13, 2005.
Niklaus et al., "Performance Model for Uncooled Infrared Bolometer Arrays and Performance Predictions of Bolometers Operating At Atmospheric Pressure," Infrared Physics and Technology, vol. 51, pp. 168-177, 2008.
Rogalski "Infrared Detectors At the Beginning Of the Next Millenium," Opto-Electron Review, vol. 9, No. 2, pp. 173-187, 2001.

* cited by examiner

*Primary Examiner* — Kevin M Nguyen
(74) *Attorney, Agent, or Firm* — Seager, Tufte & Wickhem LLC (57) ABSTRACT

A pixel having a reflector situated on a substrate. A temperature sensitive resistor may be situated over at least a portion of the reflector. An insulator may be situated on the resistor. The resistor and insulator may effectively be very thin films. A flat metal mesh or grid may be situated on the insulator. The grid, insulator and resistor may be supported by two or more posts at approximately one-fourth of a wavelength from the reflector. The wavelength may be that of the radiation to be sensed by the pixel. The thermal mass of the combination of the temperature sensitive resistor, insulator and grid may be less than several times the thermal mass of the grid. Since the grid may be so thin for low noise performance and high sensitivity, the grid can have a flatness assured to a desired extent with stiffeners attached to portions of it.

20 Claims, 11 Drawing Sheets

HIGH PERFORMANCE DETECTION PIXEL

BACKGROUND

The invention pertains to sensors and particularly to pixel sensors. More particularly, the invention pertains to highly sensitive radiation pixel sensors.

SUMMARY

The invention is a pixel having a reflector situated on a substrate. A temperature sensitive resistor may be situated over at least a portion of the reflector. An insulator may be situated on the resistor. The resistor and insulator may effectively be very thin films. A flat metal mesh or grid may be situated on the insulator. The grid, insulator and resistor may be supported by two or more posts at approximately one-fourth of a wavelength from the reflector. The wavelength may be that of the radiation to be sensed by the pixel. The thermal mass of the combination of the temperature sensitive resistor, insulator and grid may be less than several times the thermal mass of the grid. Since the grid may be so thin for low noise performance and high sensitivity, the grid can have a flatness assured to a desired extent with stiffeners attached to portions of it.

BRIEF DESCRIPTION OF THE DRAWING

FIG. 1b is a plan view of the pixel in FIG. 1a,

FIG. 3c is a diagram of the expanded view of the pixel showing a cross-section line for obtaining a view of the leg contact in FIG. 3a;

FIG. 3d is a diagram of the plan view of the pixel showing the cross-section line for the view of the leg contact in FIG. 3a;

DESCRIPTION

For a microbolometer, it is desirable to have a device that is as sensitive to infrared radiation as much as possible. The ultimate limit of sensitivity may be defined by the background noise level. The background limit may be a higher sensitivity than that imposed by thermal conduction noise. Related art pixels may operate above the thermal conduction noise floor which is higher than the background noise floor. The present pixel described herein may operate very close to the background-limited noise floor by making the thermal limit almost equal to the background limit.

In other words, the pixel may have a thermal conduction noise floor that is very close to the background limited noise floor. To achieve this, the mass and conductance of the pixel should be significantly lower than related-art pixels while still maintaining a high fill factor and high infrared absorption. The present device may use a large area low mass mesh grid with a reflector placed on the substrate and located a quarter-wave away. The quarter-wave may be relative to the wavelength (e.g., 10 microns) of the radiation that the device is designed to detect. The grid may have a sheet resistance between 300 and 400 ohms/sq. In a particular example, the grid may have a sheet resistance of about 366 ohms/sq. The grid may be on a pitch that is small (e.g., between 10 percent and 100 percent smaller) compared to the wavelength of light or radiation to be detected. The mesh may permit the metal to be between 10 and 100 percent thicker than it would be if it were in sheet form. Because the mesh is so thin for low noise performance and high sensitivity, vertical rib supports may be located around and attached to the perimeter or frame of the grid to stiffen it and prevent the grid and/or frame from sagging and bowing, and maintain a flatness to an extent as desired. It is possible for a grid not to need stiffeners or supports. These low conductance supports may also exist in the legs to keep the legs straight and reduce bending. The $VO_x$ and insulating $SiO_2$ films or layers may also be thin. $SiO_2$ may be used wherever possible because of its low thermal/electrical conductance, although $Si_3N_4$ might be a reasonable substitute for some functions.

This pixel may be integrated with readout electronics. The electronics should have low noise performance. A key part of the processing may be forming the high aspect ratio vertical ribs. The ribs may be formed by a photolithography process that generally produces defects called "wings". In this case, the high aspect ratio $SiO_2$ or $Si_3N_4$ wings may be formed as the last step and so, while fragile, will not be subject to additional processing. The film may be deposited over the edge of a photo lithographically produced edge that permits step coverage. When the $SiO_2$ film is patterned and delineated into a narrow strip across the edge, the high aspect ratio part may remain but will have very little thickness or mass.

Figure 1A:
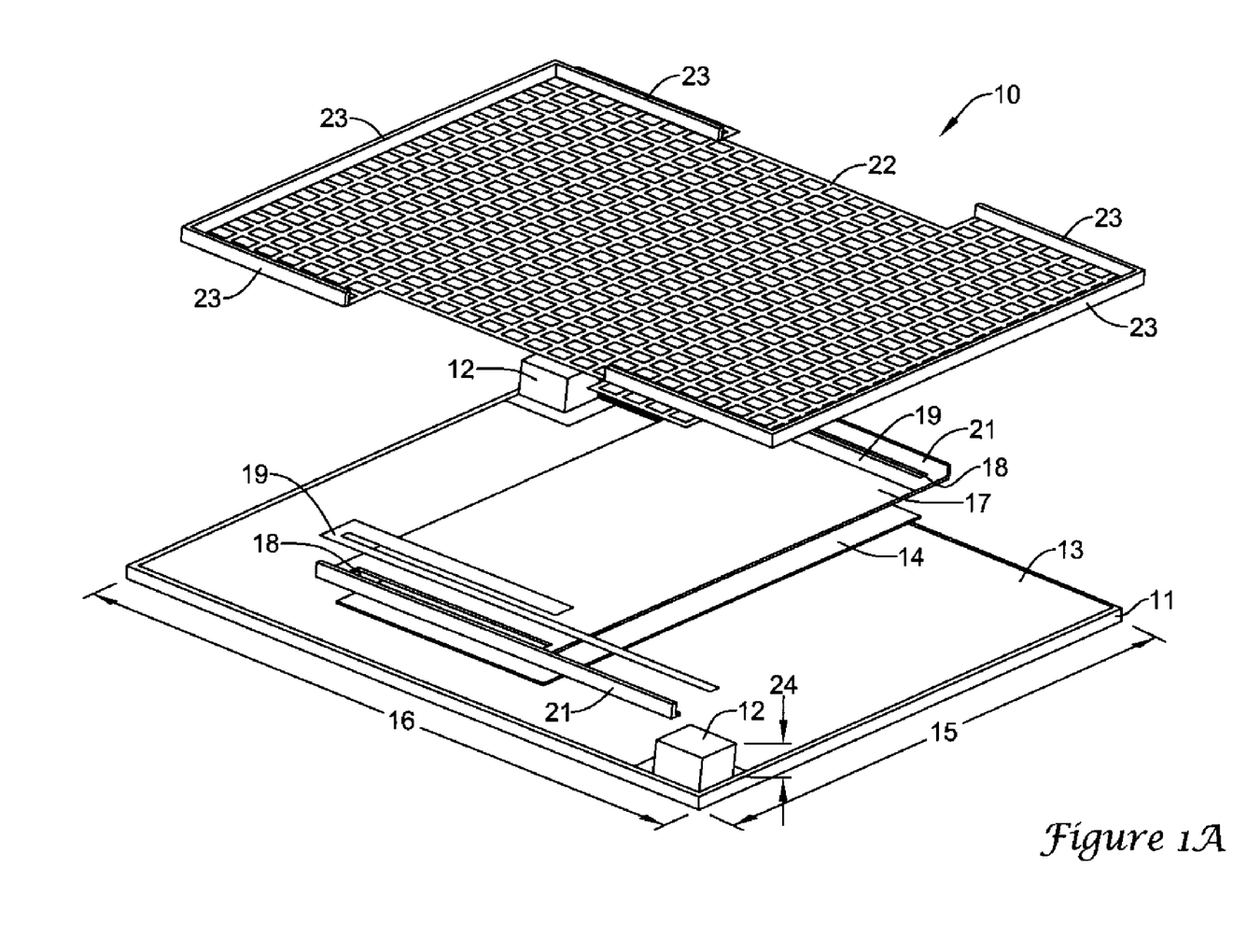
FIG. 1a is a diagram of an expanded view of a BLIM pixel.

FIG. 1a is a diagram of a BLIM pixel 10 in an expanded view. The pixel may have a substrate 11 which is a silicon complementary-metal-oxide-semiconductor (CMOS). The substrate may be fabricated with another material and/or process.

At least two pixel posts 12 may be formed on substrate 11 at reasonable places, such as, for example, at a set of diagonal corners. Formed on substrate 11 may be a metal reflector 13. The metal of reflector 13 may be, for example, chromium or platinum. Reflector 13 could be another metal. Formed over reflector 13, at a gap of about a quarter-wavelength of the radiation to be sensed, may be a temperature sensitive resistor or layer 14. Layer 14 may cover nearly all of the reflector 13 and substrate 11 along a dimension 15 and about 40 percent of the reflector 13 and substrate 11 along a dimension 16. Coverage may vary according to a specific design of the pixel. Layer 14 may be centered on dimension 16. Layer 14 may instead provide a different amount of coverage over reflector 13. Layer 14 may be a high temperature coefficient material. Layer 14 may be, for example, vanadium oxide. Layer 14 could be another high temperature coefficient material such as hydrogenated amorphous silicon. An insulator layer 17 may be formed on layer 14. Layer 17 may be congruent to layer 14. Layer 17 may insulate layer 14 from a metal mesh or grid 22 positioned on layer 17. At both ends of layer 14 may be vias 18 in layer 17 close to the edges of dimension 16. Two metal strip-like contacts 19 may be placed on insulator layer 17 at the vias 18, respectively, so as to have electrical contact with $VO_x$ layer 14. Contacts 19 may extend out to pixel posts 12 to facilitate an electrical connection external of pixel 10. Each thin leg or contact 19 may have a support leg 21 attached to provide rigidity to the contact. Contacts 19 or support legs 21 connected to pixel posts 12 may support or hold layers 14 and 17 at a quarter-wavelength distance from reflector 13.

Formed on insulator layer 17, reflector 13 and pixel posts 12 may be a metal mesh or grid absorber 22. Layer 17 may be regarded as a grid insulator for mesh or grid 22. Posts 12 may support mesh or grid 22. Grid 22 may be structurally stiffened and supported with support legs 23 attached to a major portion of the perimeter of mesh 22. Legs 23 may be regarded as stiffeners and be composed of $SiO_2$ or other appropriate material. However, it is possible for a grid 22 to have a design not needing stiffeners or supports 23. When mesh or grid 22 is in place, the gap 24 may exist between the mesh 22, along with layers 14 and 17, and reflector 13. Gap 24 may be about one-fourth of the wavelength of the radiation to be sensed by pixel 10. For example, if the radiation to be detected has a 10 micron wavelength, then gap 24 may be about 2.4 or 2.5 microns for good sensitivity. However, gap 24 design and proportion may have a different ratio relative to the radiation wavelength.

Figure 1B:
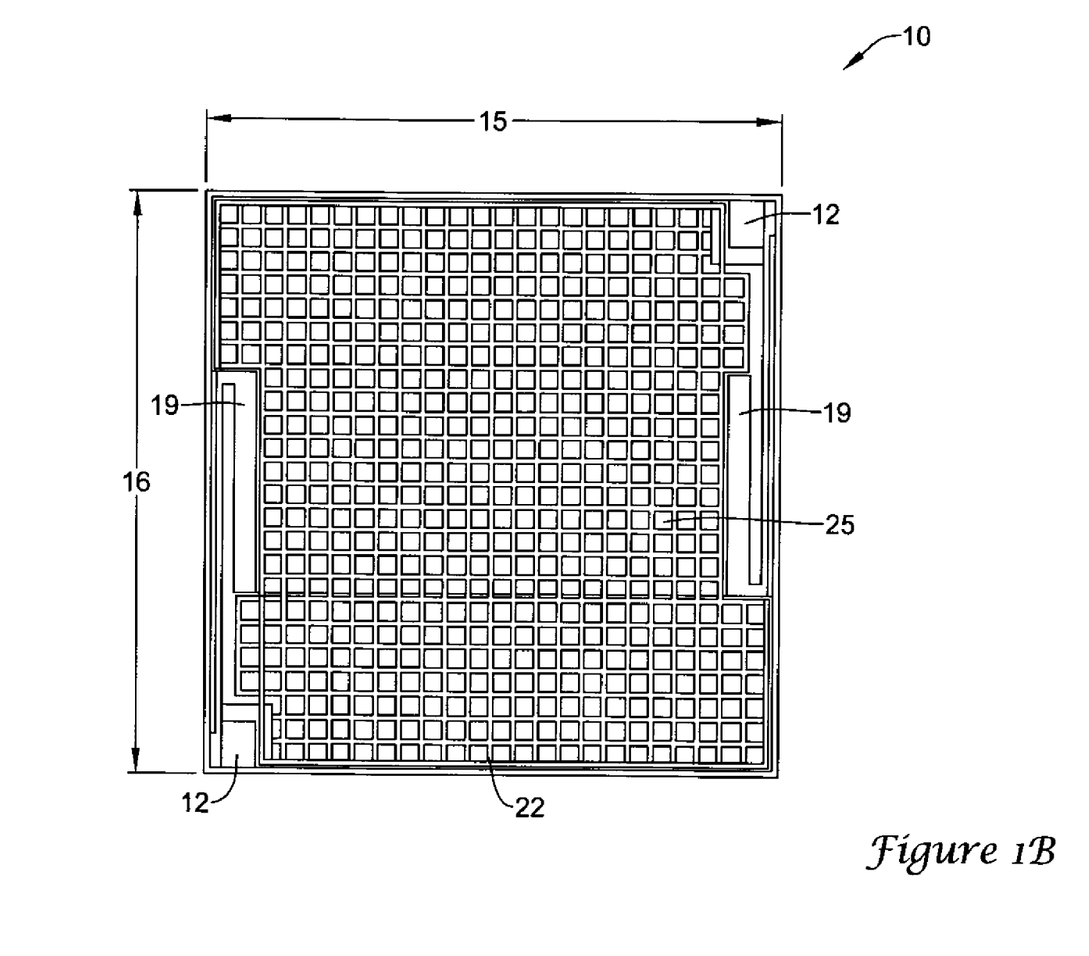

FIG. 1b is a top view of pixel 10 showing mesh 22, posts 12, contacts 19 and an area 25 which $VO_x$ layer 14 and insulator layer 17 cover.

Pixel 10 of FIG. 1a is an illustrative example with particular materials and dimensions mentioned herein. However, pixel 10 may have different structure, shape, dimensions and materials than those items of the pixel described herein.

The design of pixel 10, as described herein, may result in a thermal mass of the combination of the temperature sensitive resistor 14, insulator 17 and the metal grid absorber 22, being less than one to ten times than the thermal mass of the metal mesh or grid absorber 22. Typical values of the combination thermal mass may be less than two, five or ten times the thermal mass of the grid.

$VO_x$ layer 14 may have a thickness of about 60 nm. However, the layer 14 thickness may be between 10 nm and 200 nm. Layer 14 may have a 3.7 percent TCR, weigh $2\times10^{-1}$ g. and have a resistance of about 40K ohms. Insulator layer 17 may have a thickness of 100 nm, be composed of $SiO_2$ and weigh about $2\times10^{-11}$ g. However, the layer 17 thickness may be between 10 nm and 200 nm. Insulator layer 17 may be of another appropriate material and/or design. Contacts 19, for connection to $VO_x$ layer 14, may be composed of NiCr and have dimensions of 40×1×0.015 micron. Contacts or legs 19 may be $6\times10^{-9}$ W/K and have a resistance of 8K ohms. Contacts 19 may be of another appropriate material and/or design. Each support leg 21 of each leg or contact 19 may be "L" shaped, have dimensions of 40×1×0.1 micron, be composed of $SiO_2$ and have $3\times10^{-9}$ W/K. Support legs 21 may be of another material and/or design. Mesh layer 22 may be composed of NiCr, have a sheet resistance of about 366 ohms per square, be on a 2 micron center, and weigh about $6\times10^{-11}$ g. Dimensions 15 and 16 of pixel 10 or cell may each be about 2 mils. However, each of dimensions 15 and 16 may be between 0.5 mil and 5 mils.

Figure 4A:
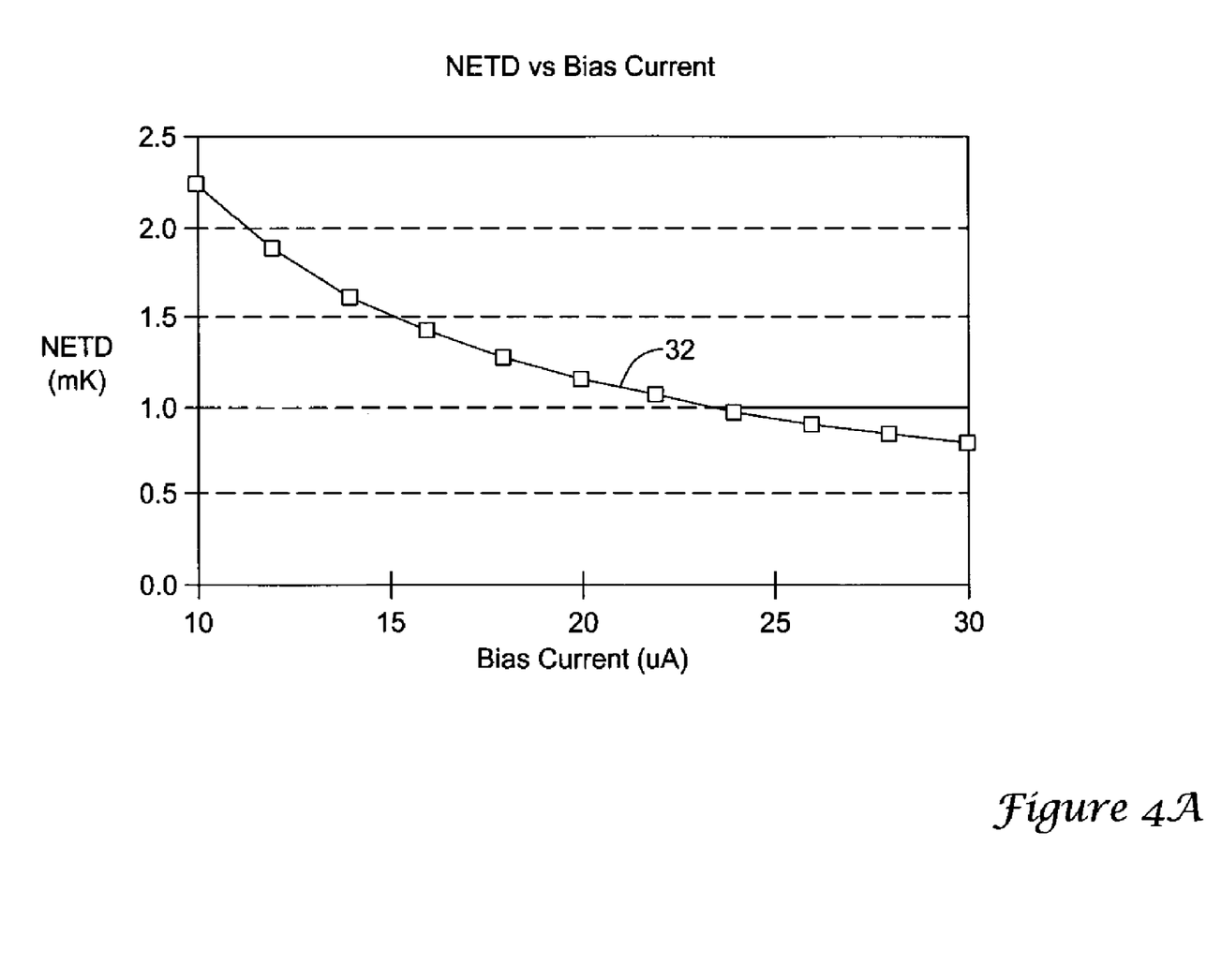
FIG. 4a is a graph of NETD versus bias current of the pixel.
Figure 4B:
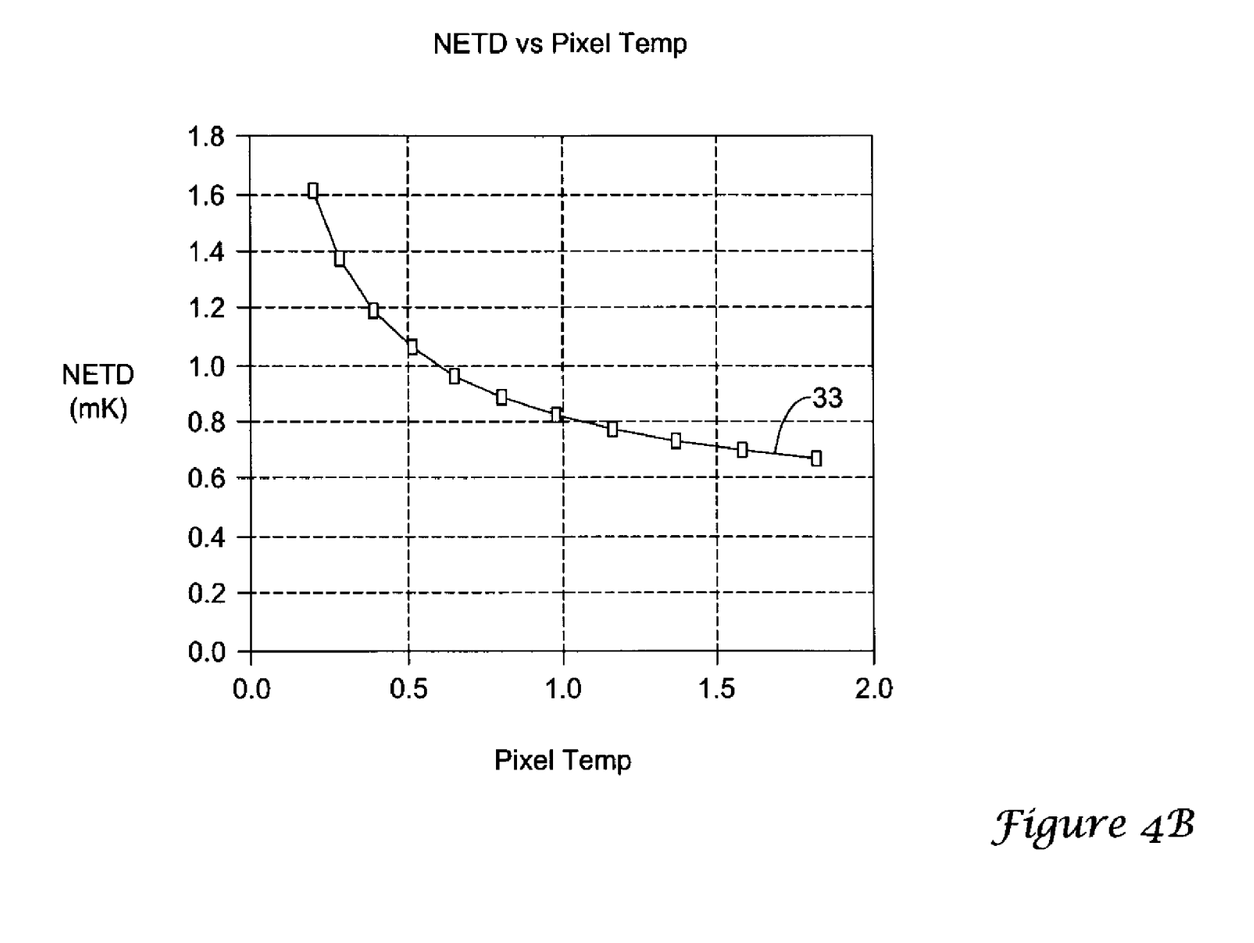
FIG. 4b is a graph of NETD versus temperature of the pixel.
Figure 4C:
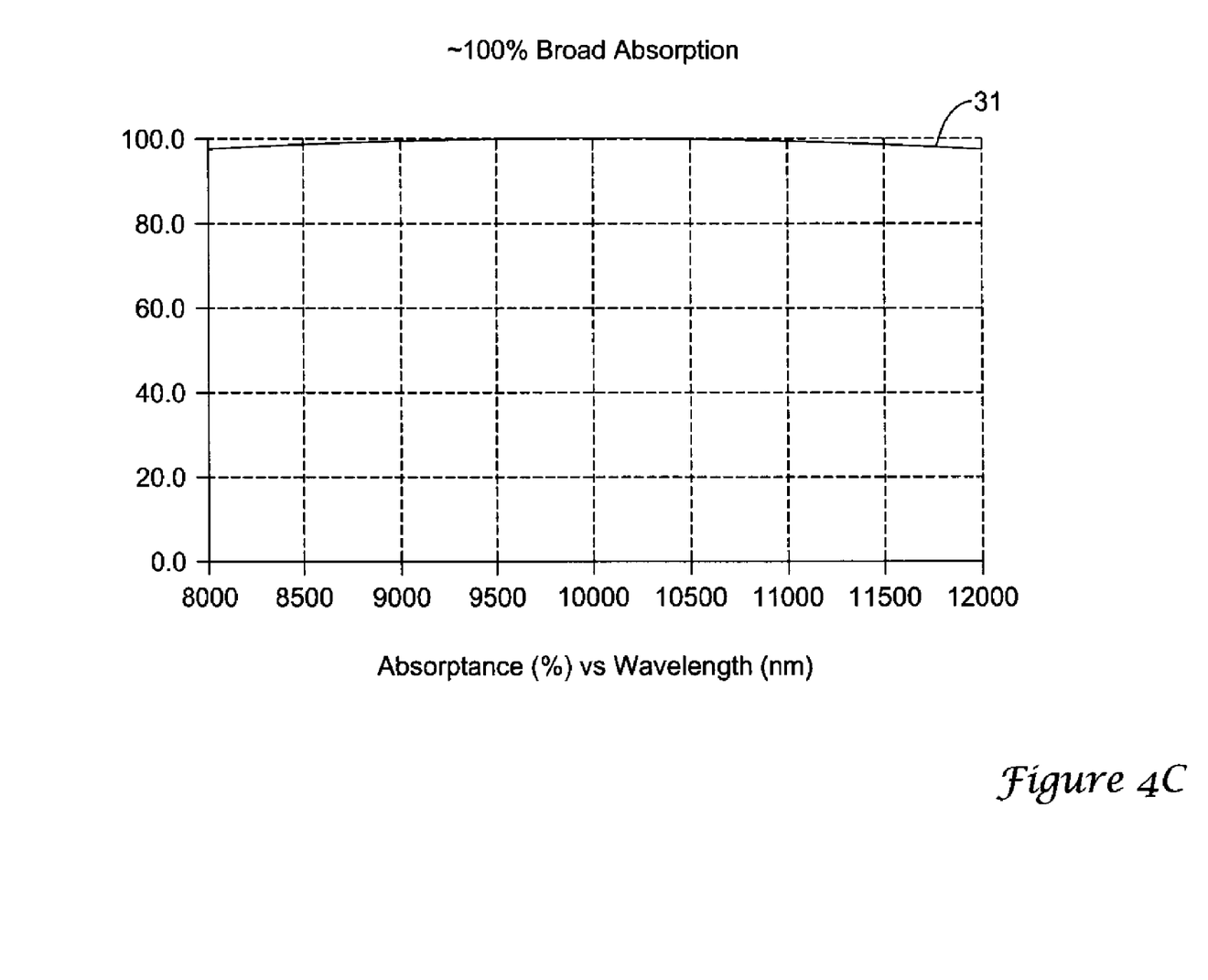
FIG. 4c is a graph of absorption versus wavelength of the pixel.

Approximate parameter and performance values may be noted for the disclosed example of pixel 10. Fill factor (FF) may be about 85 percent. Absorption (Abs) may be greater than 95 percent as shown by a plotted curve 31 of absorption versus wavelength in the graph of FIG. 4c. Curve 31 appears to show nearly 100 percent absorption between 8000 and 12,000 nm. G may be about $9\times10^{-9}$ W/K (std=1.5e-7). C may be about 2×10e-10 J/K (J/° C.) (std=3.4e-9). $K_f$ may be about 8e-14. Tau ($\tau$) may be about 22 milliseconds. Temperature rise may be about 0.5 deg. C. NETD may be about 1 mK at 20 microamperes. Although with some changes in the present pixel 10 design, the NEDT may be between 0.1 mK and 5 mK at a bias current somewhere between 1 and 50 microamperes. FIG. 4a shows a plotted curve 32 in a graph of NETD (mK) versus bias current (microamperes). FIG. 4b shows a plotted curve 33 of NETD (mK) versus pixel temperature.

Although the acronyms and terms used herein are present in the related art, some are noted for convenience. "NETD" is a noise equivalent temperature difference. "G" is thermal conduction between the pixel and its surroundings. "C" may be heat capacity or thermal mass of the pixel. "K" is a 1/f—noise constant of the resistive material (dependent on the pixel temperature). "$\tau$" (tau) is a thermal time constant of the pixel.

Figure 2:
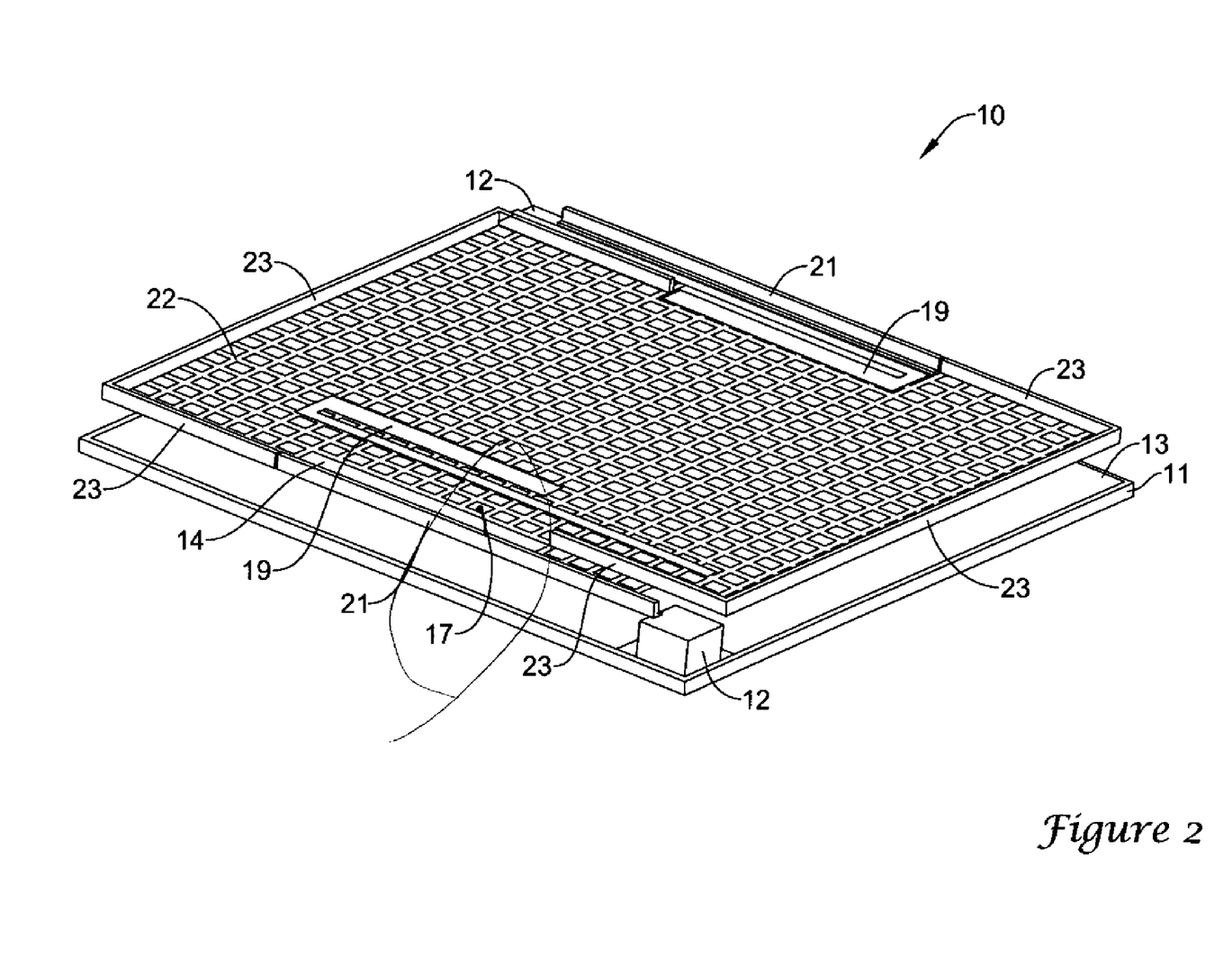
FIG. 2 is a perspective view of the BLIM pixel.

FIG. 2 is a perspective view of the BLIM pixel 10, except that the components are put together and attached except for the contact strip 19 and at the lower portion of the Figure for illustrative purposes.

Figure 3A:
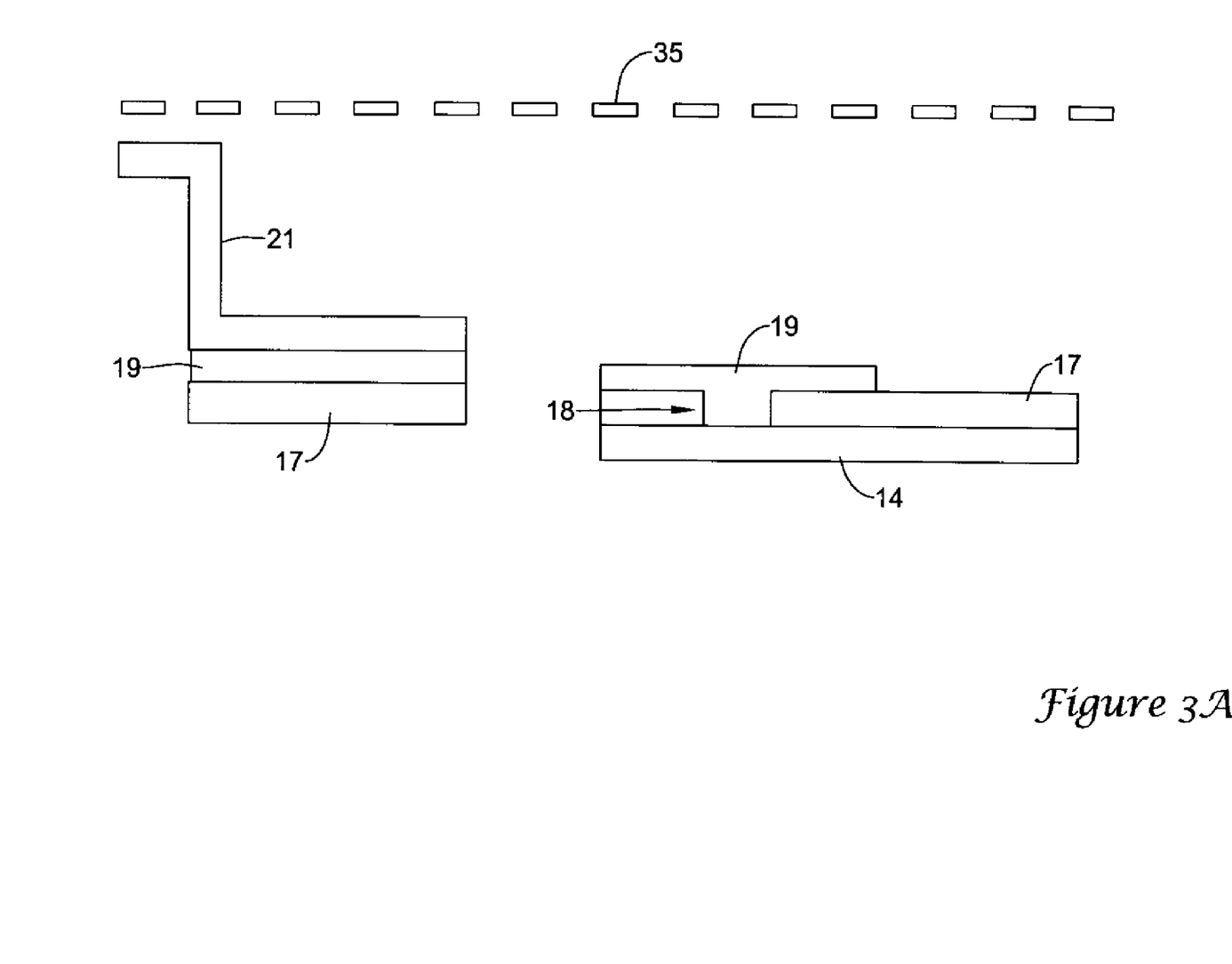
FIG. 3a is a diagram of a cross-section of a leg-conductor.
Figure 3B:
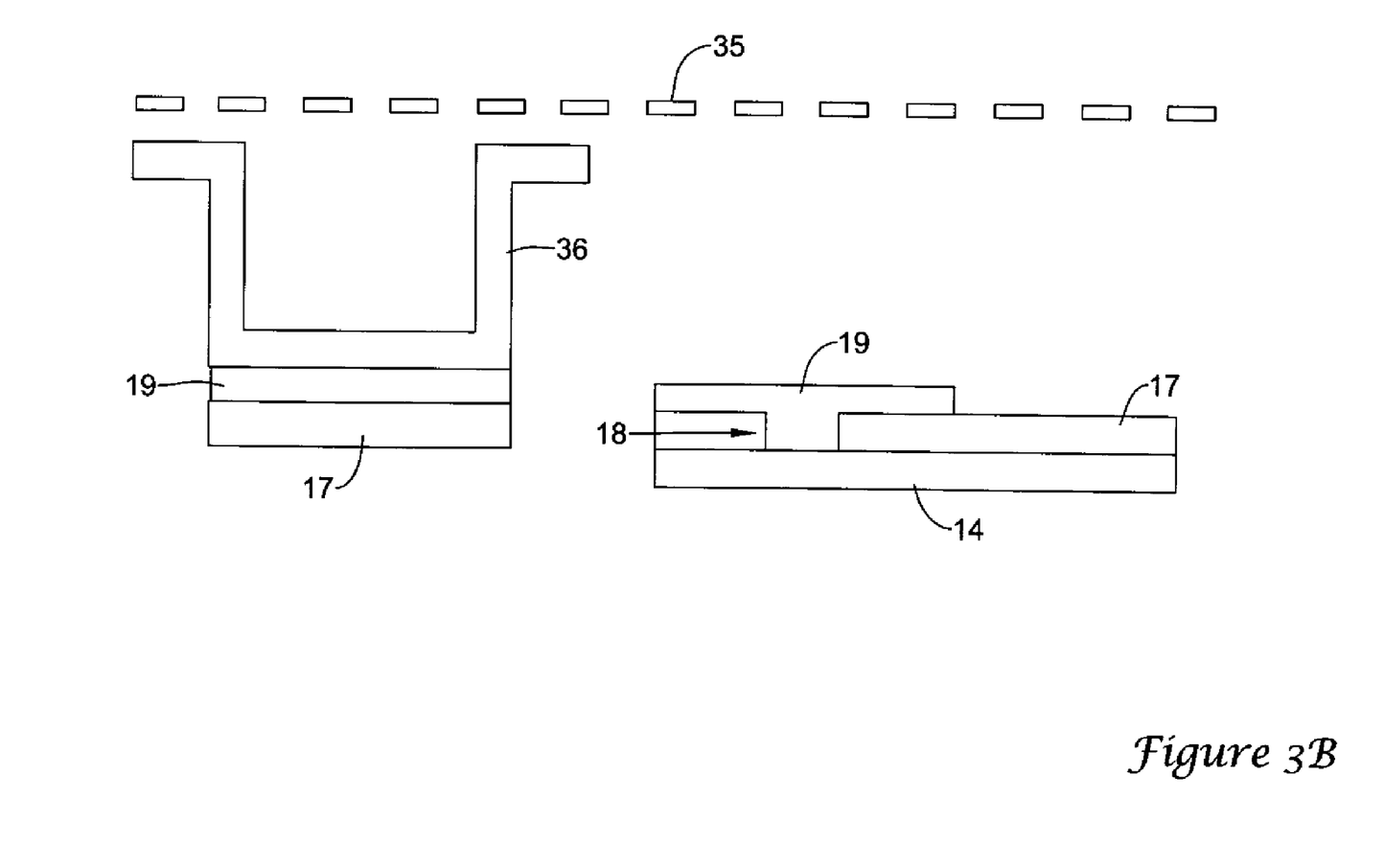
FIG. 3b is a diagram of a cross-section of an optional design of a leg-conductor.
Figure 3C:
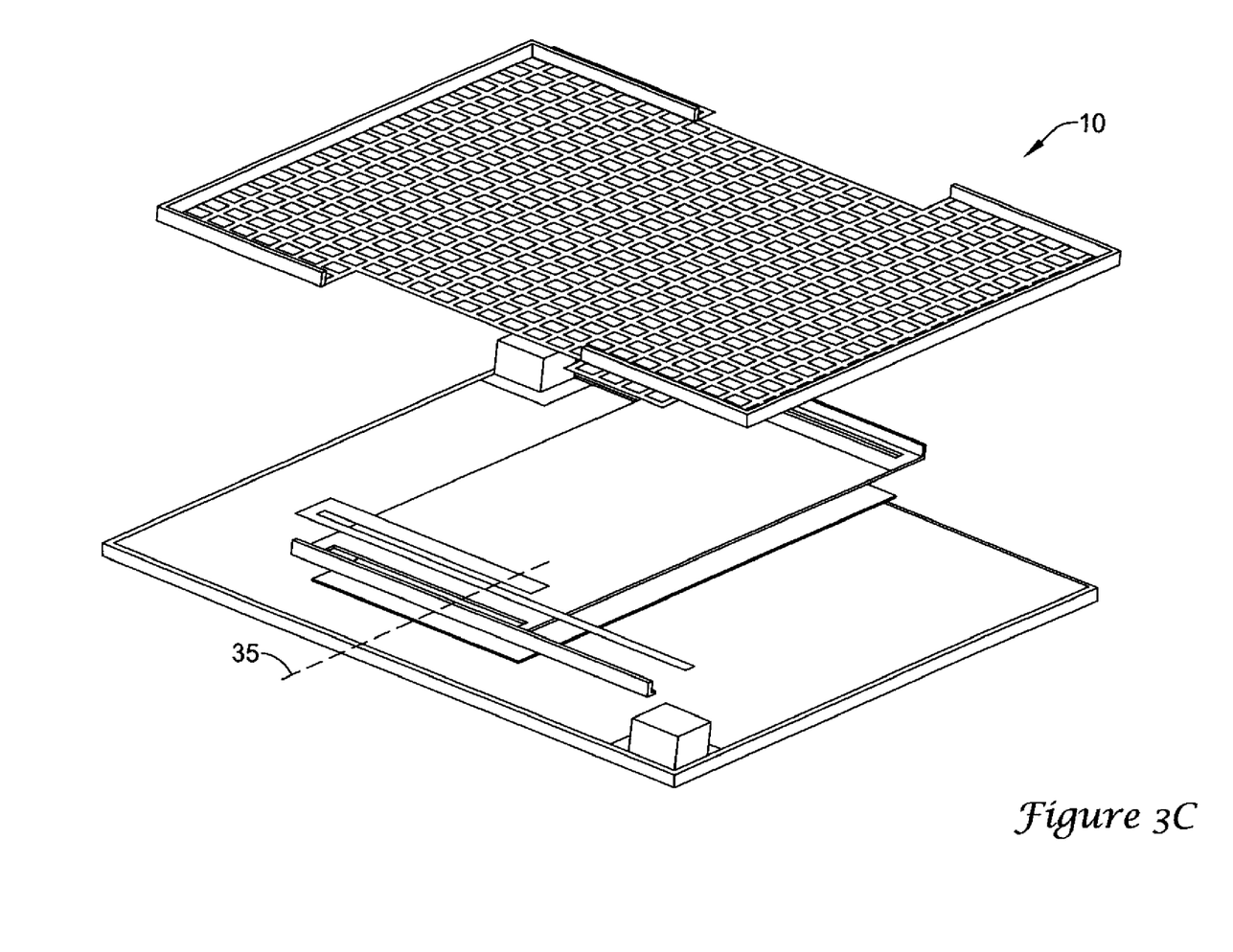
Figure 3D:
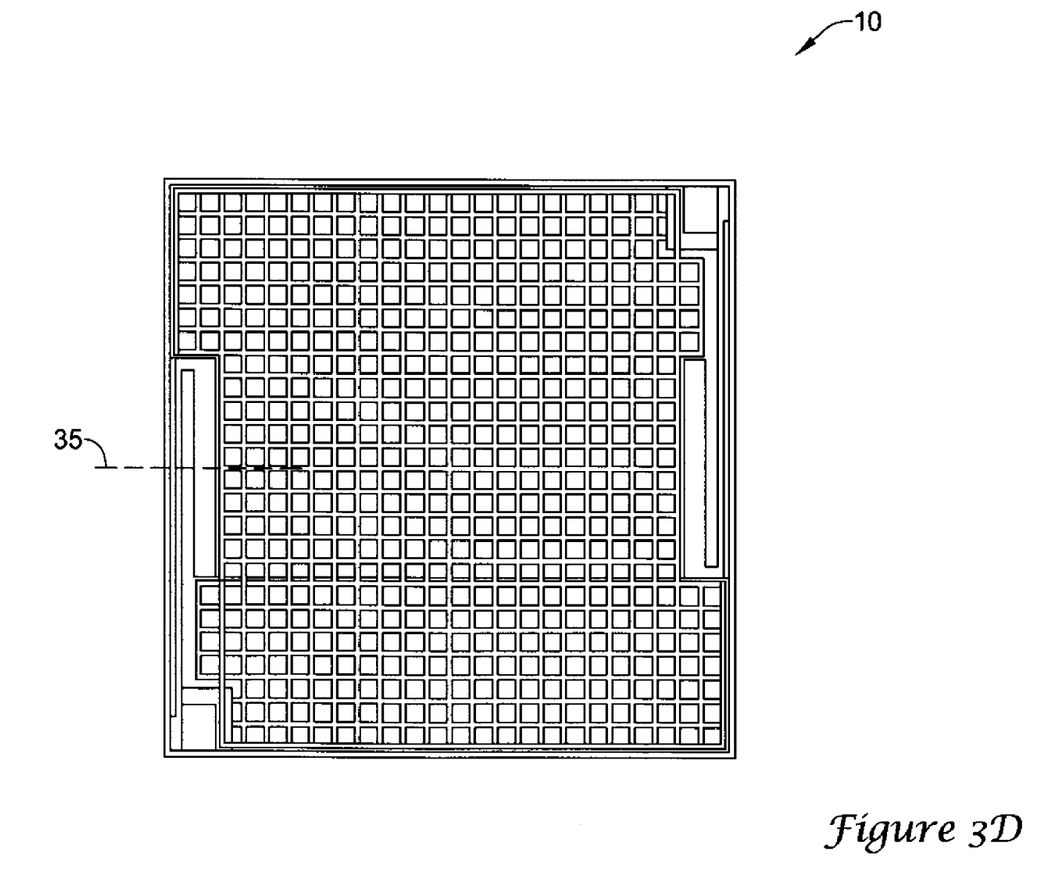

FIG. 3a shows a leg-pixel cross-section as indicated by section line 35 for a vertical cut to show a profile of the contact leg 19, support leg 21, via 18, insulator layer 17 and $VO_x$ layer 14. Support leg 21 has one 90 degree side. FIG. 3b shows an optional leg-pixel in cross section, which has a support leg 36 with two 90 degree sides resembling a channel structure. Support leg 36 may provide more rigidity for contact leg 19 than support leg 21. Items in FIGS. 3a and 3b may be referred to as a HAR-RIB. Other designs may be used for support legs 21.

Figure 5:
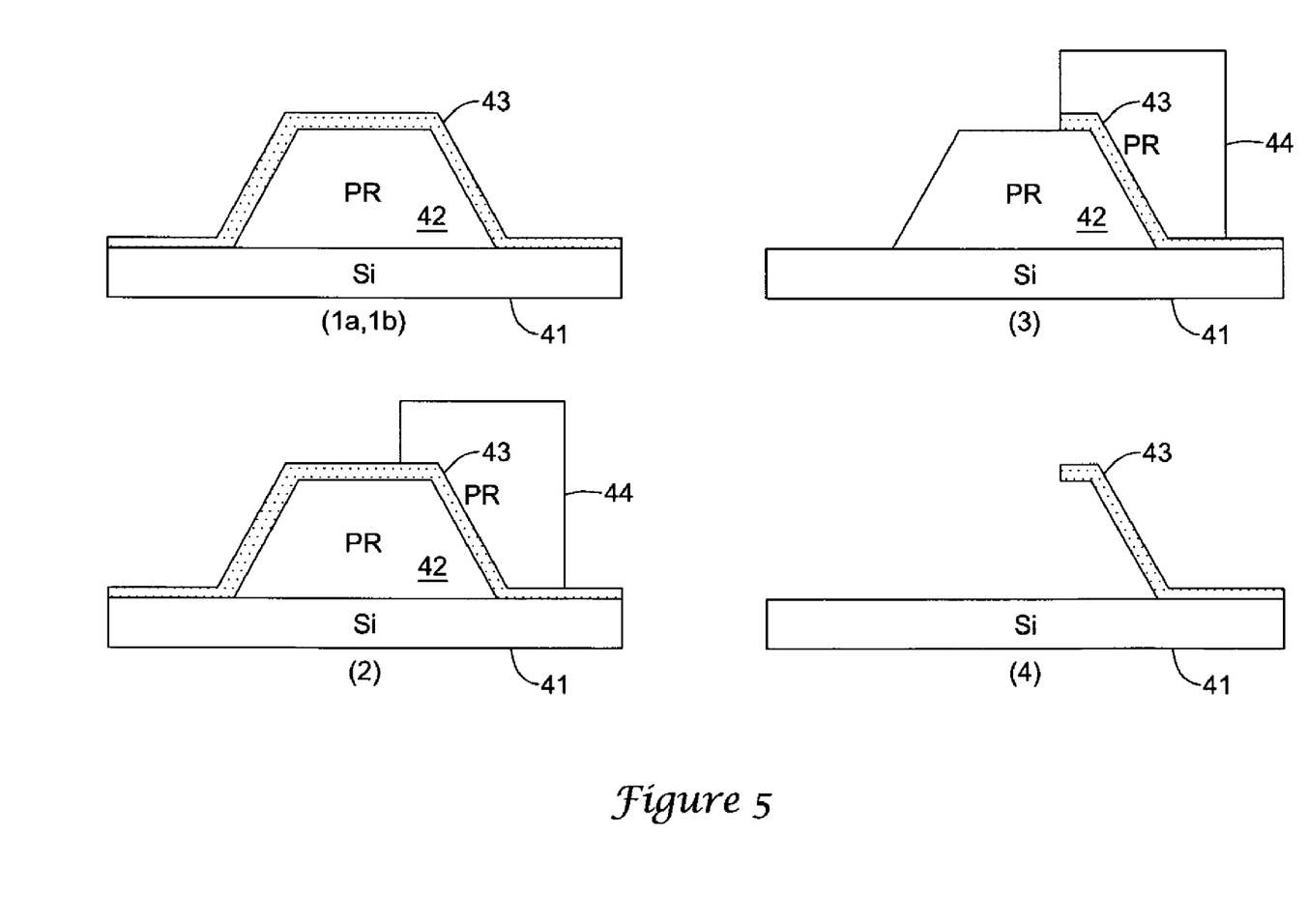
FIG. 5 is a diagram showing a process for fabricating a support leg for a strip-like metal contact.

FIG. 5 is a diagram of a fabrication process for a support leg for a contact leg 19, referred to as a HAR-RIB. In steps 1a, 1b, a photoresist 42 may be formed on a silicon substrate 41, and a layer 43 of $SiO_2$ may be deposited over photoresist 42, respectively. In step 2, photoresist 44 may be formed and patterned over the edge of layer 43. In step 3, the exposed portions of layer 43 may be removed with an etch. In step 4, the photoresist 42 and 44 may be removed to form a HAR-RIB layer 43 of $SiO_2$. Other material and/or designs may be used for the HAR-RIB layer.

The patent documents noted in the following appear to be relevant. U.S. Pat. No. 7,145,143, issued Dec. 5, 2006, is hereby incorporated by reference. U.S. Pat. No. 6,838,306, issued Jan. 4, 2005, is hereby incorporated by reference. U.S. Pat. No. 6,495,070, issued Dec. 17, 2002, is hereby incorporated by reference. U.S. Pat. No. 6,144,285, issued Nov. 7, 2000, is hereby incorporated by reference. U.S. Pat. No. 6,097,031, issued Aug. 1, 2000, is hereby incorporated by reference. U.S. Pat. Re. 36,706, reissued May 23, 2000, is hereby incorporated by reference. U.S. Pat. Re. 36,136, reissued Mar. 9, 1999, is hereby incorporated by reference.

In the present specification, some of the matter may be of a hypothetical or prophetic nature although stated in another manner or tense.

Although the present system has been described with respect to at least one illustrative example, many variations and modifications will become apparent to those skilled in the art upon reading the specification. It is therefore the intention that the appended claims be interpreted as broadly as possible in view of the prior art to include all such variations and modifications.

What is claimed is:
1. A radiation sensing pixel comprising:
 a reflector situated on a substrate;
 at least two posts situated on the substrate;
 a temperature sensitive resistor situated over a portion of the reflector;
 an insulator situated on the temperature sensitive resistor; and
 a metal grid absorber situated on the insulator and in a plane approximately parallel to the reflector; and wherein:
the temperature sensitive resistor, insulator and the metal grid absorber are supported by the at least two posts at a first distance from the reflector;
a thermal mass of a combination of the temperature sensitive resistor, insulator and the metal grid absorber is less than ten times than a thermal mass of the metal grid absorber; and
the distance is a fraction of a wavelength of radiation for sensing by the pixel.

2. The pixel of claim 1, wherein the metal grid absorber has a sheet resistance of between 300 and 400 ohms/square.

3. The pixel of claim 2, wherein the metal grid has a sheet resistance of approximately 366 ohms per square.

4. The pixel of claim 1, further wherein:
the temperature sensitive resistor is IR transparent; and
the insulator is IR transparent.

5. The pixel of claim 1, wherein the first distance between the reflector layer and the metal grid is approximately a quarter of the wavelength of radiation for sensing by the pixel.

6. The pixel of claim 1, wherein:
the temperature sensitive resistor comprises vanadium oxide; and
the insulator comprises a material from a group consisting of silicon dioxide and silicon nitride.

7. The pixel of claim 6, wherein:
the temperature sensitive resistor is between 10 and 200 nm thick; and
the insulator is between 10 and 200 nm thick.

8. The pixel of claim 1, wherein the temperature sensitive resistor comprises amorphous silicon.

9. The pixel of claim 1, wherein:
the metal grid comprises NiCr;
the reflector comprises chromium; and
the substrate comprises a silicon complementary metal-oxide-semiconductor.

10. The pixel of claim 1, wherein the pixel has cell dimensions between 0.5 and 5 mils.

11. The pixel of claim 1, wherein the pixel has an NETD of between 0.1 and 5 mK.

12. The pixel of claim 1, wherein the metal grid is on a pitch that is between 10 and 90 percent smaller than a wavelength of radiation to be sensed by the pixel.

13. The pixel of claim 1, wherein a thermal conduction noise limit is approximately equal to a background-limited noise floor of the pixel.

14. The pixel of claim 1, further comprising:
a stiffener structure attached to portions of the metal grid;
a first contact leg connected through a first via of the insulator to a first end of the temperature sensitive resistor; and
a second contact leg connected through a second via of the insulator to a second end the temperature sensitive resistor;
a first support leg attached to the first contact leg; and
a second support leg attached to the second contact leg.

15. The pixel of claim 14, wherein:
the stiffener structure comprises a material from a group consisting of silicon dioxide and silicon nitride; and
the first and second support legs comprise a material from a group consisting of silicon dioxide and silicon nitride.

16. A sensing pixel comprising:
at least two pixel posts situated on a substrate;
a reflector situated on the substrate;
a temperature sensitive resistor situated over the reflector;
an insulator situated on the temperature sensitive resistor; and
a metal grid situated on the insulator; and
wherein:
the temperature sensitive resistor, the insulator and metal grid are held at a first distance from the reflector by the at least two pixel posts; and
a thermal mass of a combination of the temperature sensitive resistor, insulator and the metal grid is less than ten times than a thermal mass of the metal grid absorber.

17. The pixel of claim 16, wherein:
the reflector comprises chromium;
the metal grid comprises NiCr;
the insulator layer comprises a material from a group consisting of silicon dioxide and silicon nitride; and
the substrate comprises a silicon complementary metal-oxide-semiconductor.

18. The pixel of claim 16, wherein the metal grid has a sheet resistance between 300 and 400 ohms per square.

19. An infrared pixel comprising:
at least two pixel posts situated on a substrate;
a reflector situated on the substrate;
a vanadium oxide layer situated on at least a portion of the reflector;
an insulator layer situated on the vanadium oxide layer;
a metal grid situated on the insulator layer;
the vanadium oxide layer, the insulator layer and the metal grid are supported at a first distance from the reflector by the at least two pixel posts; and
a thermal mass of a combination of the temperature sensitive resistor, insulator and the metal grid absorber is less than ten times than a thermal mass of the metal grid absorber; and
the distance is a fraction of a wavelength of radiation for sensing by the pixel.

20. The pixel of claim 19, further comprising:
a stiffener structure attached to portions of the metal grid;
a first contact leg connected through a first via of the insulator layer to a first place at the vanadium oxide layer;
a second contact leg connected through a second via of the insulator layer to a second place at the vanadium oxide layer;
a first support leg attached to the first contact leg; and
a second support leg attached to the second contact leg.

* * * * *